(12) United States Patent
Allan et al.

(10) Patent No.: US 11,820,701 B2
(45) Date of Patent: Nov. 21, 2023

(54) METHOD FOR ACHIEVING A STRESS PROFILE IN A GLASS

(71) Applicant: CORNING INCORPORATED, Corning, NY (US)

(72) Inventors: Douglas Clippinger Allan, Corning, NY (US); Xiaoju Guo, Pittsford, NY (US); Guangli Hu, Berkeley Heights, NJ (US); Gaozhu Peng, Horseheads, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 17/345,049

(22) Filed: Jun. 11, 2021

(65) Prior Publication Data

US 2021/0300819 A1 Sep. 30, 2021

Related U.S. Application Data

(60) Continuation of application No. 16/585,247, filed on Sep. 27, 2019, now Pat. No. 11,034,614, which is a division of application No. 14/540,328, filed on Nov. 13, 2014, now Pat. No. 10,442,730.

(60) Provisional application No. 61/908,369, filed on Nov. 25, 2013.

(51) Int. Cl.
*C03C 21/00* (2006.01)
*C03C 3/093* (2006.01)
*C03C 4/18* (2006.01)

(52) U.S. Cl.
CPC ............ *C03C 21/002* (2013.01); *C03C 3/093* (2013.01); *C03C 4/18* (2013.01); *C03C 21/005* (2013.01); *C03C 2204/00* (2013.01); *Y10T 428/315* (2015.01)

(58) Field of Classification Search
None
See application file for complete search history.

(56) References Cited

U.S. PATENT DOCUMENTS

| 3,410,673 A | 11/1968 | Marusak |
| 3,533,888 A | 10/1970 | Eppler et al. |
| 3,630,704 A | 12/1971 | Garfinkel et al. |
| 3,798,013 A | 3/1974 | Hasegawa et al. |

(Continued)

FOREIGN PATENT DOCUMENTS

| CN | 102092940 A | 6/2011 |
| CN | 102791646 A | 11/2012 |

(Continued)

OTHER PUBLICATIONS

European Patent Application No. 14808777.8 Office Action dated Jan. 28, 2020; 7 Pages; European Patent Office.

(Continued)

*Primary Examiner* — Queenie S Dehghan
(74) *Attorney, Agent, or Firm* — Travis B. Gasa

(57) ABSTRACT

A method for generating various stress profiles for chemically strengthened glass. An alkali aluminosilicate glass is brought into contact with an ion exchange media such as, for example, a molten salt bath containing an alkali metal cation that is larger than an alkali metal cation in the glass. The ion exchange is carried out at temperatures greater than about 420° C. and at least about 30° C. below the anneal point of the glass.

19 Claims, 10 Drawing Sheets

(56) References Cited

U.S. PATENT DOCUMENTS

| | | |
|---|---|---|
| 5,846,280 A | 12/1998 | Speit |
| 6,607,999 B2 | 8/2003 | Hachitani |
| 8,951,924 B2 | 2/2015 | Krueger et al. |
| 9,140,543 B1 | 9/2015 | Allan et al. |
| 9,156,724 B2 | 10/2015 | Gross |
| 9,290,413 B2 | 3/2016 | Dejneka et al. |
| 2009/0220761 A1 | 9/2009 | Dejneka et al. |
| 2010/0009154 A1 | 1/2010 | Allan et al. |
| 2010/0028607 A1 | 2/2010 | Lee et al. |
| 2011/0294648 A1 | 12/2011 | Chapman et al. |
| 2012/0135226 A1 | 5/2012 | Bookbinder et al. |
| 2012/0194974 A1 | 8/2012 | Weber et al. |
| 2013/0101764 A1 | 4/2013 | Schaut et al. |
| 2013/0224492 A1* | 8/2013 | Bookbinder .......... C03C 21/002 65/30.14 |
| 2014/0017499 A1 | 1/2014 | Yamamoto |
| 2014/0106172 A1 | 4/2014 | Dejneka et al. |
| 2014/0109616 A1 | 4/2014 | Varshneya |
| 2014/0212649 A1 | 7/2014 | Katayama et al. |
| 2016/0102014 A1 | 4/2016 | Hu et al. |

FOREIGN PATENT DOCUMENTS

| | | |
|---|---|---|
| CN | 103068759 A | 4/2013 |
| JP | 54-017765 A | 2/1979 |
| JP | 57-179055 A | 11/1982 |
| JP | 2011-527661 | 11/2011 |
| JP | 2013-049603 A | 3/2013 |
| TW | 200948738 A | 12/2009 |
| WO | 00/47529 A1 | 8/2000 |
| WO | 2013/031855 A1 | 3/2013 |
| WO | 2013/088856 A1 | 6/2013 |

OTHER PUBLICATIONS

International Preliminary Report on Patentability of the International Searching Authority; PCT/US2014/065920; dated Jun. 9, 2016; 9 Pages; European Patent Office.

International Search Report and Writen Opinion of the International Searching Authority; PCT/US2014/065920; dated Feb. 9, 2015.

Korean Patent Application No. 10-2016-7016881, Office Action dated Nov. 11, 2020, 8 pages; (4 pages of English Translation and 4 pages of Original Document); Korean Patent Office.

Sglavo et al.; "In situ observation of crack propagation in ESP (engineered stress profile) glass"; Engineering Fracture Mechanics 74 (2007); pp. 1383-1398.

Chinese Patent Application No. 202010483996.1, Office Action dated Jan. 19, 2022, 5 pages of English Translation, Chinese Patent Office.

* cited by examiner

METHOD FOR ACHIEVING A STRESS PROFILE IN A GLASS

CROSS-REFERENCE TO RELATED APPLICATIONS

This application is a continuation of U.S. patent application Ser. No. 16/585,247 filed on Sep. 27, 2019, which is a divisional of U.S. patent application Ser. No. 14/540,328 filed on Nov. 13, 2014, which claims the benefit of priority under 35 U.S.C. § 119 of U.S. Provisional Application Ser. No. 61/908,369 filed on Nov. 25, 2013 the content of each are relied upon and incorporated herein by reference in their entirety.

BACKGROUND

The disclosure relates to a method of chemically strengthening a glass. More particularly, the disclosure relates to a method of chemically strengthening a glass by ion exchange to generate a stress profile within the glass.

Ion exchange has been used to chemically strengthen a glass, providing the surface of the glass with a compressive layer that is resistant to the introduction of flaws that cause the glass to crack and break. The profile of compressive stress extending from the surface into the glass is typically linearly decreasing or can be approximated by a complementary error function (erfc).

SUMMARY

The present disclosure provides a method for generating various stress profiles for chemically strengthened glass. An alkali aluminosilicate glass is brought into contact with an ion exchange media such as, for example, a molten salt bath containing an alkali metal cation that is larger than an alkali metal cation in the glass. The ion exchange is carried out at temperatures greater than about 420° C. and at least about 30° C. below the anneal point of the glass. A method of forming a stress profile in an alkali aluminosilicate glass and an alkali aluminosilicate glass article having an engineered stress profile are also provided.

Accordingly, one aspect of the disclosure is to provide a method of strengthening an alkali aluminosilicate glass. The alkali aluminosilicate glass has an anneal point and comprises a plurality of first metal cations. The method comprises: immersing the alkali aluminosilicate glass in a molten salt bath comprising at least one salt of a second metal, wherein cations of the second metal are larger than the first metal cations; and ion exchanging cations of the second metal from the molten salt bath for the first metal cations in the alkali aluminosilicate glass at a temperature of greater than about 420° C. and at least about 30° C. less than the anneal point. The ion exchange forms a region of compressive stress extending from a surface of the glass to a depth of layer of at least about 40 μm into the glass, wherein the a compressive stress at a first depth is at least about 50% of the compressive stress at the surface of the glass and the first depth being between about 30% and about 70% of the depth of layer.

A second aspect of the disclosure is to provide a method of forming a compressive stress profile in an alkali aluminosilicate glass article. The method comprises immersing the alkali aluminosilicate glass article in an ion exchange bath at a temperature greater than about 420° C. and at least about 30° C. less than an anneal point of the alkali aluminosilicate glass article, and exchanging a plurality of first cations in the single ion exchange bath for a plurality of second cations in the alkali aluminosilicate glass article to form a region of compressive stress extending from a surface of the alkali aluminosilicate glass article to a depth of layer of at least about 40 μm into the alkali aluminosilicate glass article, wherein a first compressive stress at a first depth is at least about 50% of a compressive stress at the surface, the first depth being between about 30% and about 70% of the depth of layer.

A third aspect of the disclosure is to provide an alkali aluminosilicate glass article having a region under a compressive stress. The region extends from a surface of the alkali aluminosilicate glass article to a depth of layer of at least about 40 μm within the alkali aluminosilicate glass article. The alkali aluminosilicate glass article has a compressive stress at the surface and a first compressive stress at a first depth, the first depth being between about 30% and about 70% of the depth of layer, wherein the first compressive stress is at least about 50% of the compressive stress at the surface.

These and other aspects, advantages, and salient features will become apparent from the following detailed description, the accompanying drawings, and the appended claims.

DETAILED DESCRIPTION

Figure 1:
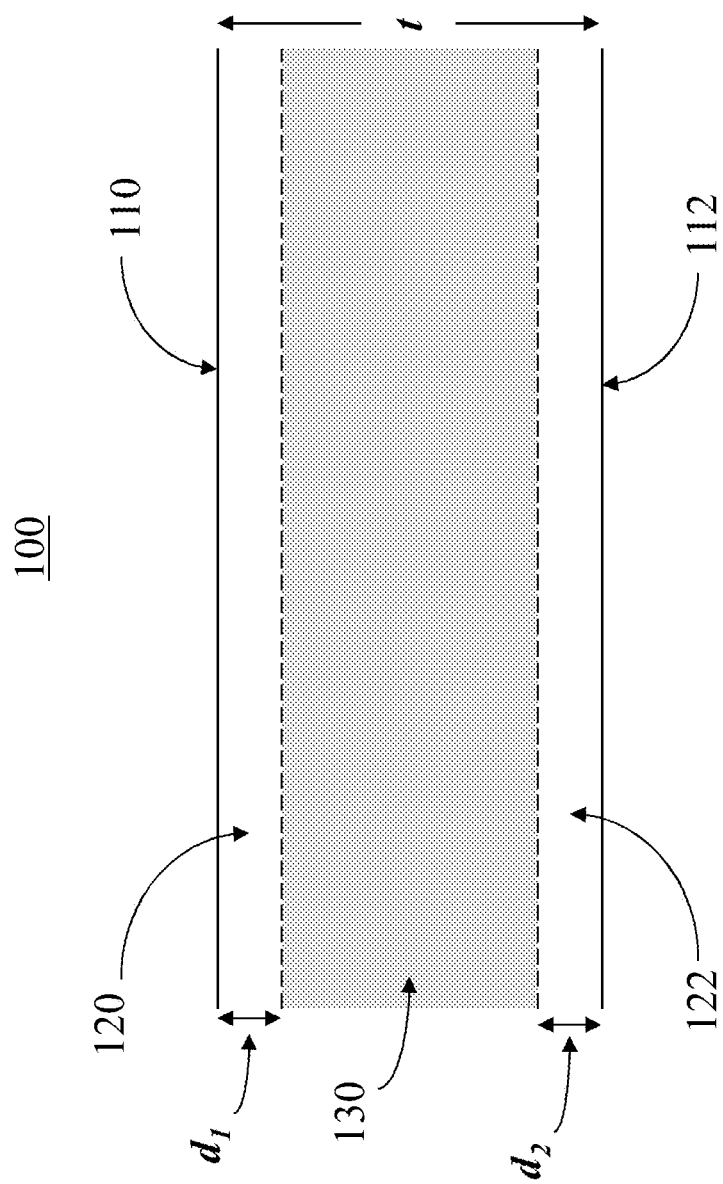
FIG. 1 is a schematic cross-sectional view of an ion exchanged glass article.

In the following description, like reference characters designate like or corresponding parts throughout the several views shown in the figures. It is also understood that, unless otherwise specified, terms such as "top," "bottom," "outward," "inward," and the like are words of convenience and are not to be construed as limiting terms. In addition, whenever a group is described as comprising at least one of a group of elements and combinations thereof, it is understood that the group may comprise, consist essentially of, or consist of any number of those elements recited, either individually or in combination with each other. Similarly, whenever a group is described as consisting of at least one of a group of elements or combinations thereof, it is understood that the group may contain any number of those elements recited, either individually or in combination with each other. Unless otherwise specified, a range of values, when recited, includes both the upper and lower limits of the range as well as any ranges therebetween. As used herein, the indefinite articles "a," "an," and the corresponding definite article "the" mean "at least one" or "one or more," unless otherwise specified. It also is understood that the various features disclosed in the specification and the drawings can be used in any and all combinations.

As used herein, the term "glass article" and "glass articles" are used in their broadest sense to include any object made wholly or partly of glass. Unless otherwise specified, all compositions are expressed in terms of mole percent (mol %).

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue. Thus, a glass that is "substantially free of MgO," for example, is one in which MgO is not actively added or batched into the glass, but may be present in very small amounts as a contaminant.

Compressive stress and depth of layer are measured using those means known in the art. Such means include, but are not limited to, measurement of surface stress (FSM) using commercially available instruments such as the FSM-6000, manufactured by Luceo Co., Ltd. (Tokyo, Japan), or the like, and methods of measuring compressive stress and depth of layer are described in ASTM 1422C-99, entitled "Standard Specification for Chemically Strengthened Flat Glass," and ASTM 1279.19779 "Standard Test Method for Non-Destructive Photoelastic Measurement of Edge and Surface Stresses in Annealed, Heat-Strengthened, and Fully-Tempered Flat Glass," the contents of which are incorporated herein by reference in their entirety. Surface stress measurements rely upon the accurate measurement of the stress optical coefficient (SOC), which is related to the birefringence of the glass. SOC in turn is measured by those methods that are known in the art, such as fiber and four point bend methods, both of which are described in ASTM standard C770-98 (2008), entitled "Standard Test Method for Measurement of Glass Stress-Optical Coefficient," the contents of which are incorporated herein by reference in their entirety, and a bulk cylinder method. As used herein, "DOL" refers to the depth of the compressive layer determined by FSM measurements.

Referring to the drawings in general and to FIG. 1 in particular, it will be understood that the illustrations are for the purpose of describing particular embodiments and are not intended to limit the disclosure or appended claims thereto. The drawings are not necessarily to scale, and certain features and certain views of the drawings may be shown exaggerated in scale or in schematic in the interest of clarity and conciseness.

Ion exchange is commonly used to chemically strengthen glasses. In one particular example, alkali cations within a source of such cations (e.g., a molten salt, or "ion exchange," bath) are exchanged with smaller alkali cations within the glass to achieve a layer that is under a compressive stress (CS) near the surface of the glass. For example, potassium ions from the cation source are often exchanged with sodium ions within the glass. The compressive layer extends from the surface to a depth of layer (DOL) within the glass.

A cross-sectional schematic view of a planar ion exchanged glass article is shown in FIG. 1. Glass article 100 has a thickness t, first surface 110, and second surface 112. While the embodiment shown in FIG. 1 depicts glass article 100 as a flat planar sheet or plate, glass article may have other configurations, such as three dimensional shapes or non-planar configurations. Glass article 100 has a first compressive layer 120 extending from first surface 110 to a depth of layer $d_1$ into the bulk of the glass article 100. In the embodiment shown in FIG. 1, glass article 100 also has a second compressive layer 122 extending from second surface 112 to a second depth of layer $d_2$. Glass article also has a central region 130 that extends from $d_1$ to $d_2$. Central region 130 is under a tensile stress or central tension (CT), which balances or counteracts the compressive stresses of layers 120 and 122. The depth $d_1$, $d_2$ of first and second compressive layers 120, 122 protects the glass article 100 from the propagation of flaws introduced by sharp impact to first and second surfaces 110, 112 of glass article 100, while the compressive stress minimizes the likelihood of a flaw penetrating through the depth $d_1$, $d_2$ of first and second compressive layers 120, 122.

Figure 2:
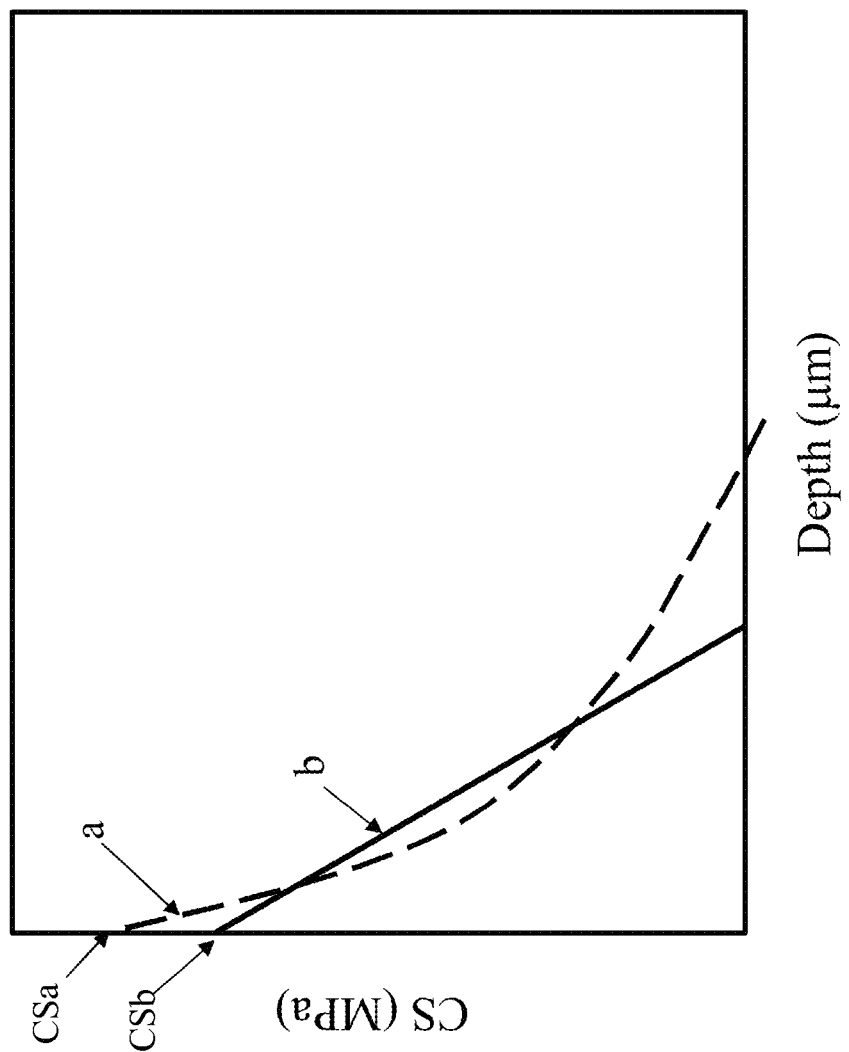
FIG. 2 is a schematic illustration of compressive stress profiles (i.e., compressive stress versus depth) obtained by ion exchange.

Typical compressive stress profiles (i.e., compressive stress versus depth) obtained by ion exchange are schematically shown in FIG. 2. In one aspect, the stress profile has a linearly decreasing complementary error function shape (represented by line "a" in FIG. 2) with a compressive stress at the surface of $CS_a$. In another aspect, the compressive stress profile is linear (represented by line "b" in FIG. 2) with a compressive stress at the surface of $CS_b$.

"Engineered" stress profiles that are neither linear nor error function-like have been obtained by two-step, or dual, ion exchange processes, which are typically carried out at temperatures at about 420° C. or less. However, managing the dual ion exchange process is complicated, as ion exchange temperature and the Na to K ratio in the individual ion exchange baths must be carefully managed to avoid surface tension, and maintenance of two separate ion exchange baths is cost prohibitive.

Described herein is a method of generating an engineered stress profile in alkali aluminosilicate glasses and glass articles through an ion exchange of glass over a wide temperature range. Different types of non-linear or non-error function profiles may be achieved with the ion exchange process by selecting an ion exchange temperature. Using a mechanistic model, it has been found that such engineered profiles can have higher retained strength and less strength variation than those linear or error-function-like profiles that are obtained using dual ion exchange. The observed mechanical advantages are supported by indentation fracture threshold testing and abraded ring on ring testing. Knowing the field failure flaw characteristic in different applications, an optimal stress profile may be designed to achieve optimum product reliability.

Accordingly, methods of ion exchanging and strengthening alkali aluminosilicate glasses are provided. The alkali glass comprises a plurality of first metal cations and has an anneal point. As used herein, the term "anneal point," refers to the temperature at which a glass has a viscosity of $10^{13.2}$ poise.

In a first step, the alkali aluminosilicate glass is brought into contact with an ion exchange medium that contains a plurality of second metal cations. The second metal cation has the same valence/oxidation state as the first metal cation, and is larger than the first metal cation.

In some embodiments, both the first metal cation and the second metal cation are alkali metal cations. For example, the first metal cation may be $Na^+$ and the second metal cations may be $K^+$, $Rb^+$, $Cs^+$, or any combinations thereof. In some embodiments, the second metal cation may include other monovalent cations such as $Ag^+$, $Tl^+$, or the like.

In some embodiments, the ion exchange medium may include a molten or partially molten salt bath that comprises at least one ionic salt of the second metal cation. In those instances in which the second cation is $K^+$, for example, the molten salt bath may comprise potassium nitrate ($KNO_3$), potassium sulfate ($K_2SO_4$), potassium chloride (KCl), mixtures thereof, or the like. Such salts of the second metal cation typically constitute most of the molten salt bath by weight. The molten salt bath may also include smaller amounts of salts of the first metal cation as well as compounds that act to reduce attack of the bath vessel or the glass article by the molten salt. Such additional components may include, but are not limited to, selected components of the glass, such as silicic acid, alumina in gel form, silica in gel form, or the like. In some embodiments in which the first metal cation is $Na^+$ and the second cation is $K^+$, the molten salt bath comprises at least one of potassium sulfate and potassium nitrate and up to about 10% of at least one sodium salt by weight. In some embodiments, the molten salt bath may include up to about 4% of at least one sodium salt by weight.

In other embodiments, the ion exchange medium may include gels, solutions, sprays, gases, or the like that comprise ionic salts or other compounds containing the second metal cation.

In those embodiments in which the ion exchange medium is a molten salt bath, the alkali aluminosilicate glass is brought into contact with the molten salt bath by immersion in the bath. The molten salt bath is heated at a temperature that is greater than about 420° C. and is at least 30° C. less than the anneal point of the alkali aluminosilicate glass. In order to prevent breakage of the glass due to thermal shock and substantial cooling of the molten salt bath, the alkali aluminosilicate glass may be heated prior to immersion in the molten salt bath. In some embodiments, the glass may be heated prior to immersion to a temperature that is within about 50° C. of and less than the temperature of the molten salt bath.

While the glass article is immersed in the molten salt bath, second metal cations from the bath are exchanged for first metal cations in the glass, thus forming a region under a compressive stress, the region extending from the surface of the glass to a depth of layer. The glass remains immersed in the molten salt bath until a predetermined compressive stress level and/or depth of layer is achieved, after which the glass is removed from the ion exchange bath and typically washed to remove any residual salts. Actual immersion time also depends on the temperature at which the ion exchange process is carried out, glass composition, and other factors. In some embodiments, ion exchanged time ranges from about 0.5 hours up to about 8 hours. In some embodiments, the depth of layer is at least about 40 microns (μm); in other embodiments, at least about 50 μm; and in still other embodiments, at least about 70 μm. In some embodiments, the surface compressive stress $CS_s$ is at least about 100 MPa.

Figure 3A:
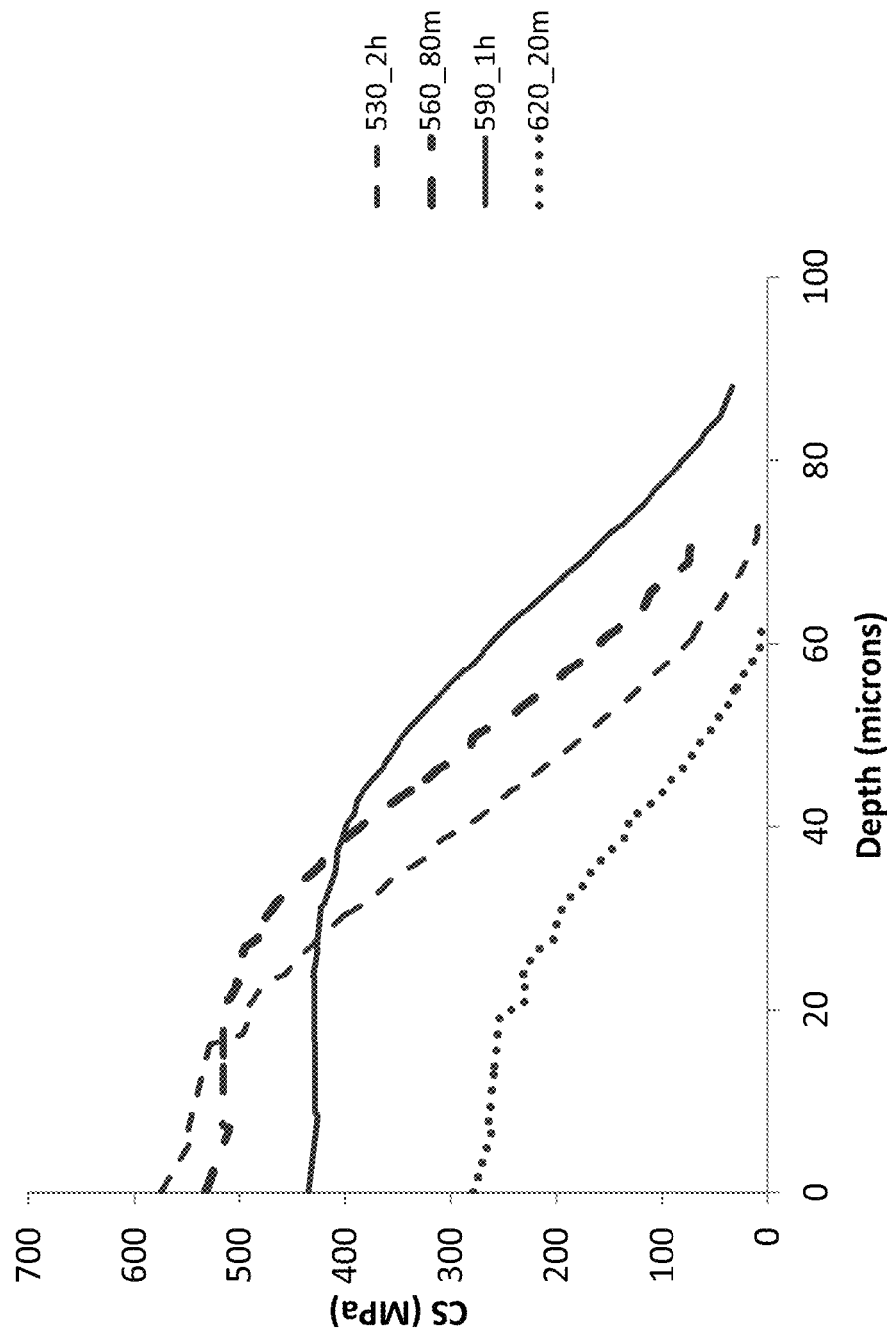
FIGS. 3a and 3b are plots of compressive stress profiles determined using the inverse WKB method for samples of a first alkali aluminosilicate glass (glass A) that were ion exchanged under different conditions.
Figure 3B:
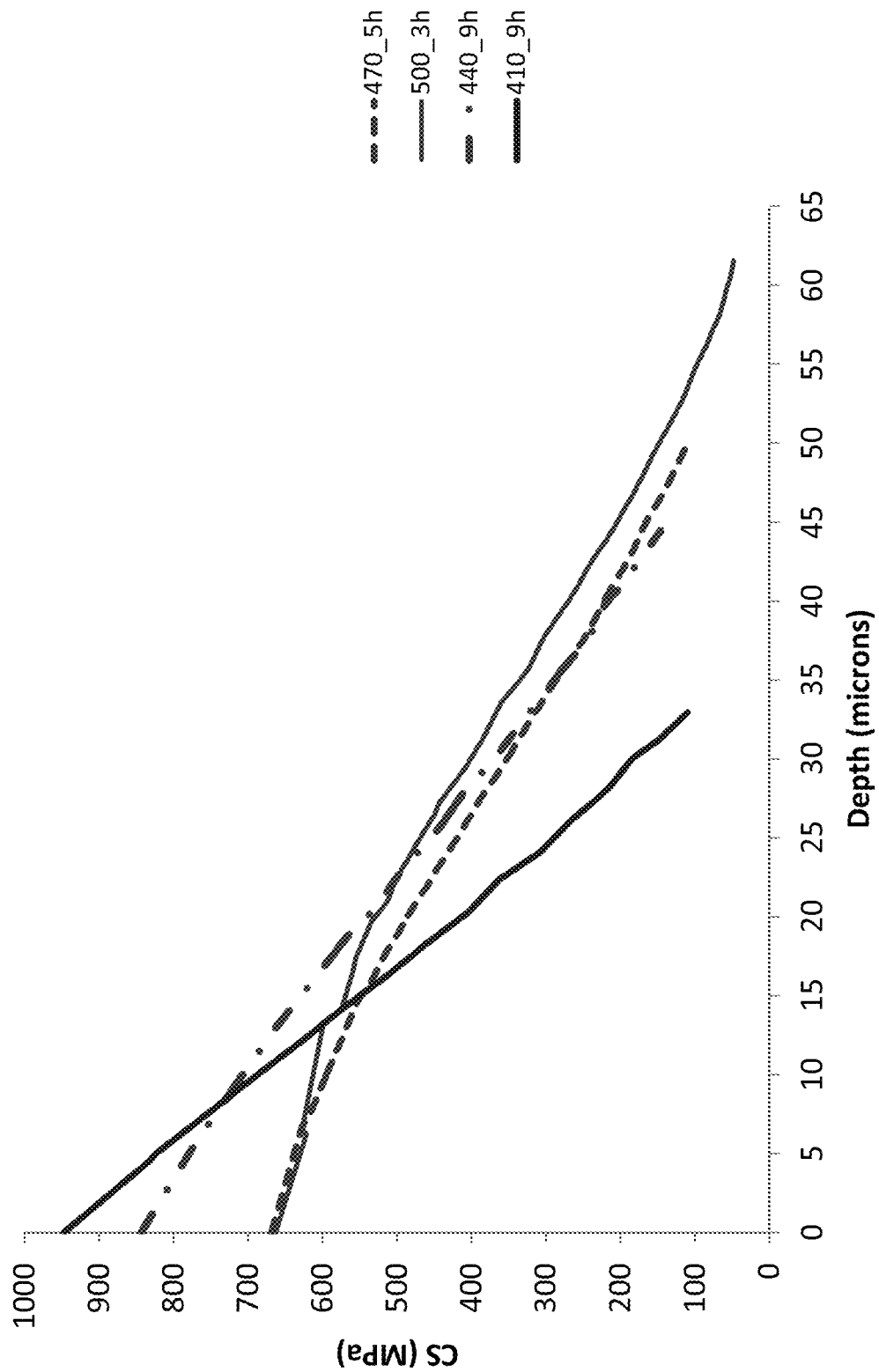

Whereas the compressive stress profile achieved in dual ion exchange processes tends to exhibit a maximum or "spike" (e.g., $CS_a$, $CS_b$ in FIG. 2) at the glass surface and decreases either linearly (line "b" in FIG. 2) or according to a complementary error function (line "a" in FIG. 2), the compressive stress profile achieved using the method described herein does not generally exhibit a "spike" at the glass surface. In the present method, the surface stress of ion exchanged glass is significantly lower than that of glass treated at "normal" ion exchange conditions; i.e., single or dual exchange at temperatures of 410° C. or less. Compared to glasses ion exchanged at "normal" temperatures of 410° C. or less, glasses that are ion exchanged at higher temperatures exhibit higher compressive stress at a deeper depth, as shown in FIGS. 3a and 3b. In one embodiment, at a first depth $d_1$ below the surface, where first depth $d_1$ is between about 30% and about 70% of the depth of layer DOL, the compressive stress is at least about 70% of the surface compressive stress. In some embodiments, the first depth $d_1$ is between about 40% and about 60% of the depth of layer, and, in other embodiments, between about 30% and about 35% of the depth of layer. In certain embodiments, first depth $d_1$ is about 25 μm. In some embodiments, the compressive stress at first depth $d_1$ is at least about 50% of the surface compressive stress $CS_s$; in other embodiments, at least about 70% of the surface compressive stress $CS_s$; and, in other embodiments, at least about 90% of the surface compressive stress $CS_s$.

The ion exchange process described hereinabove, in some embodiments, is the initial or first ion exchange to which the glass article is subjected. Following the ion exchange process described above, the glass article may undergo additional ion exchange. In those instances where a high surface compressive stress $CS_s$ "spike" is desired, the glass article may be ion exchanged in a second bath containing the second metal cation at a temperature that is less than that of the first ion exchange bath. In some embodiments, the glass article is ion exchanged in the second bath at a temperature of less than about 420° C. The second bath, in certain embodiments, comprises at least one salt of the second metal cation and is substantially free of salts of the first metal cation. In the exchange of $K^+$ for $Na^+$ in the glass article, for example, the second bath contains only potassium salts and is substantially free of any sodium salts. While ion exchange time depends on a number of factors, the ion exchange time in the second ion exchange bath is typically less than that in the first ion exchange bath.

In other embodiments, incorporation of a third, larger (i.e., larger than both the first and second metal cations), metal cation at or near the surface of the glass article may be desired to increase the compressive stress $CS_s$ at the surface. $Cs^+$ or $Rb^+$ ions, for example, may be exchanged for $K^+$ ions introduced during the first ion exchange. This may be achieved by ion exchanging the glass article at a temperature that is greater than or equal to the temperature of the first ion exchange (i.e., greater than about 420° C. and at least about 30° C. less than an anneal point of the alkali aluminosilicate glass article) in a second bath comprising the third cation. The second bath, in certain embodiments, comprises at least one salt of the third metal cation and is substantially free of salts of the first and second metal cation. In the exchange of $Cs^+$ for $K^+$ in the glass article, for example, the second ion exchange bath contains only cesium salts and is substantially free of any potassium salts. While ion exchange time depends on a number of factors, the ion exchange time in the second ion exchange bath is typically less than that in the first ion exchange bath.

By increasing the ion exchange temperature, the stress profile may be manipulated to cover almost the whole CS/depth space available for the glass article. With the specific stress profiles based upon the fracture mechanics framework described hereinbelow, retained strength as a function of flaw sizes can be predicted.

Most materials tend to fracture when stressed beyond some critical level. The stress intensity factor $K_a$ is used to predict the stress state or intensity near the crack tip caused by remote loading or by residual stresses, which can generally be expressed as $$K_a = M\sigma_a\sqrt{\pi s} \qquad (1)$$

where M is a constant depending on the crack and specimen geometry (here M=1.12), s is the crack size, and $\sigma_a$ is the applied tensile stress.

The stress intensity factor, $K_r$, due to the ion-exchange residual stress profile can be evaluated as $$K_r = \frac{M}{\sqrt{\pi s}} \int_0^s \sigma(z)g(z)dz, \qquad (2)$$

where g(z) is the Green function for the crack geometry considered and σ(z) is the engineered stress profile:

$$g(z) = \frac{2s}{\sqrt{s^2 - z^2}}. \qquad (3)$$

Fracture toughness, $K_{IC}$, is a critical material parameter to characterize the material's inherent ability to resist crack growth. In general, the fracture toughness of glass is taken to be 0.7 MPa*m$^{-1/2}$.

The crack starts to grow when the external crack driving force, $K_a$, is equal to the internal crack resistance provided by both residual stress profile, $K_r$, and the fracture toughness, $K_{IC}$, expressed as $$K_a = K_{IC} - K_r. \qquad (4)$$

When $K_r < 0$, as in equation (2) discussed above, $K_a$ is larger according to equation (4). This is the benefit of the residual compressive stress.

In another aspect, a method of forming a compressive stress profile in an alkali aluminosilicate glass article is provided. The method comprises immersing the alkali aluminosilicate glass article in an ion exchange bath, such as those described hereinabove, at a temperature greater than about 420° C. and at least about 30° C. less than the anneal point of the alkali aluminosilicate glass article; and exchanging first metal cations in the ion exchange bath for second cations in the alkali aluminosilicate glass article to form a region of compressive stress extending from a surface of the alkali aluminosilicate glass article to a depth of layer of at least about 40 µm into the alkali aluminosilicate glass article. In one embodiment, the compressive stress at a first depth $d_1$ below the surface is at least about 70% of the surface compressive stress. The first depth $d_1$ is between about 30% and about 70% of the depth of layer DOL. In some embodiments, the first depth $d_1$ is between about 40% and about 60% of the depth of layer and, in other embodiments, between about 30% and about 35% of the depth of layer. In certain embodiments, first depth $d_1$ is about 25 µm. In some embodiments, the compressive stress at first depth $d_1$ is at least about 50% of the compressive stress at the surface, also referred to as surface compressive stress $CS_s$; in other embodiments, at least about 70% of the surface compressive stress $CS_s$; and in other embodiments, at least about 90% of the surface compressive stress $CS_s$.

Figure 4:
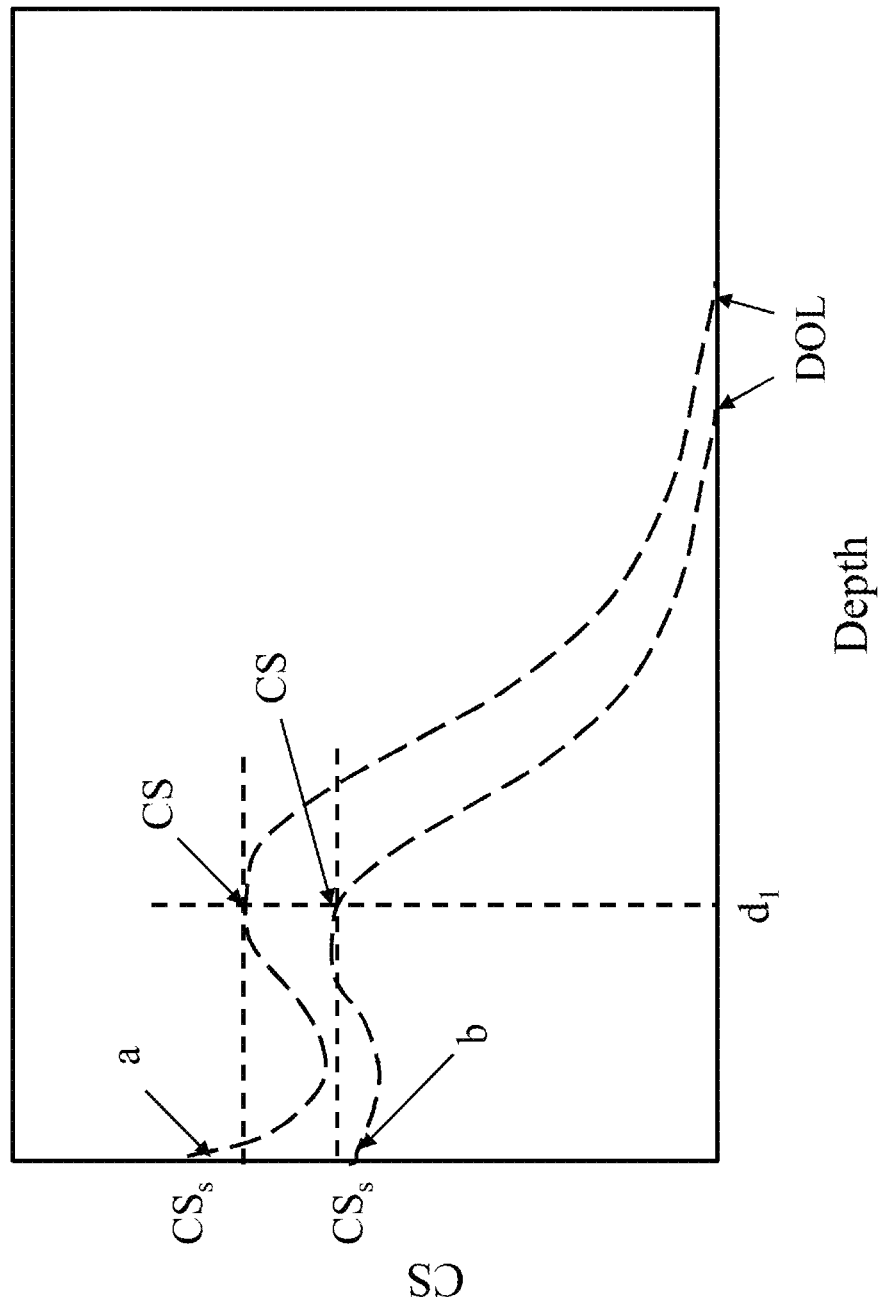
FIG. 4 is a schematic representation of engineered compressive stress profiles.

In yet another aspect, an alkali aluminosilicate glass article having an engineered stress profile is provided. The alkali aluminosilicate glass article has a region under a compressive stress extending from a surface of the article to a depth of layer DOL of at least about 40 µm within the glass article. The compressive stress and depth of layer are obtained by those methods described hereinabove. Two non-limiting examples of such engineered compressive stress profiles are schematically shown in FIG. 4. Referring to FIG. 4, the alkali aluminosilicate glass article has a compressive stress $CS_s$ at the surface (also referred to as the surface compressive stress), and a first compressive stress CS at a first depth $d_1$. The first depth $d_1$ is between about 30% and about 70% of the depth of layer DOL. In some embodiments, the first depth $d_1$ is between about 40% and about 60% of the depth of layer DOL and, in other embodiments, between about 30% and about 35% of the depth of layer DOL. In certain embodiments, the first depth $d_1$ is about 25 µm. In some embodiments, the compressive stress CS at the first depth $d_1$ is at least about 50% of the surface compressive stress $CS_s$; in other embodiments, at least about 70% of the surface compressive stress $CS_s$; and in still other embodiments, at least about 90% of the surface compressive stress $CS_s$.

In some embodiments, the compressive stress at the surface $CS_s$ of the alkali aluminosilicate glass is greater than or equal to the compressive stress CS at the first depth $d_1$ (example a in FIG. 4). In other embodiments, the compressive stress at the surface $CS_s$ of the alkali aluminosilicate glass is less than the compressive stress at the first depth $d_1$ (example b in FIG. 4). In some embodiments, the alkali aluminosilicate glass article described herein has a thickness of up to about 1.5 mm. In other embodiments, the alkali aluminosilicate glass article described herein has a thickness in a range from about 0.2 mm up to about 1.5 mm and, in still other embodiments, in a range from about 0.2 mm up to about 1.0 mm.

In some embodiments, the alkali aluminosilicate glass comprises at least about 50 mol % $SiO_2$ and at least about 11 mol % $Na_2O$, and the compressive stress is at least about 900 MPa. In some embodiments, the glass further comprises $Al_2O_3$ and at least one of $B_2O_3$, $K_2O$, MgO and ZnO, wherein $-340 + 27.1 \cdot Al_2O_3 - 28.7 \cdot B_2O_3 + 15.6 \cdot Na_2O - 61.4 \cdot K_2O + 8.1 \cdot (MgO+ZnO) \geq 0$ mol %. In particular embodiments, the glass comprises: from about 7 mol % to about 26 mol % $Al_2O_3$; from 0 mol % to about 9 mol % $B_2O_3$; from about 11 mol % to about 25 mol % $Na_2O$; from 0 mol % to about 2.5 mol % $K_2O$; from 0 mol % to about 8.5 mol % MgO; and from 0 mol % to about 1.5 mol % CaO. The glass is described in U.S. patent application Ser. No. 13/533,298, by Matthew J. Dejneka et al., entitled "Ion Exchangeable Glass with High Compressive Stress," filed Jun. 26, 2012, and claiming priority to U.S. Provisional Patent Application No. 61/503,734, filed Jul. 1, 2011, the contents of which are incorporated herein by reference in their entirety.

In other embodiments, the alkali aluminosilicate glass comprises at least about 50 mol % $SiO_2$; at least about 10 mol % $R_2O$, wherein $R_2O$ comprises $Na_2O$; $Al_2O_3$; and $B_2O_3$, wherein $B_2O_3 - (R_2O - Al_2O_3) \geq 3$ mol %. In certain embodiments, the glass comprises: at least about 50 mol % $SiO_2$; from about 9 mol % to about 22 mol % $Al_2O_3$; from about 3 mol % to about 10 mol % $B_2O_3$; from about 9 mol % to about 20 mol % $Na_2O$; from 0 mol % to about 5 mol % $K_2O$; and at least about 0.1 mol % MgO, ZnO, or combinations thereof, wherein 0<MgO<6 and 0<ZnO<6 mol %; and, optionally, at least one of CaO, BaO, and SrO, wherein 0 mol %<CaO+SrO+BaO≤2 mol %. When ion exchanged, the glass, in some embodiments, has a Vickers crack initiation threshold, which is determined by application of an indenter load to the surface, of at least about 10 kgf. Such glasses are described in U.S. patent application Ser. No. 13/903,433, by Matthew J. Dejneka et al., entitled "Zircon Compatible, Ion Exchangeable Glass with High Damage Resistance," filed May 28, 2013, and claiming priority to U.S. Provisional Patent Application No. 61/653,489, filed May 31, 2012, the contents of which are incorporated herein by reference in their entirety.

In still other embodiments, the glass comprises at least about 50 mol % $SiO_2$; at least about 10 mol % $R_2O$, wherein $R_2O$ comprises $Na_2O$; $Al_2O_3$, wherein −0.5 mol % $Al_2O_3$ (mol %)−$R_2O$(mol %)≤2 mol %; and $B_2O_3$, and wherein $B_2O_3$(mol %)−($R_2O$(mol %)−$Al_2O_3$(mol %)) 4.5 mol %. In other embodiments, the glass has a zircon breakdown temperature that is equal to the temperature at which the glass has a viscosity of greater than about 40 kPoise and comprises: at least about 50 mol % $SiO_2$; at least about 10 mol % $R_2O$, wherein $R_2O$ comprises $Na_2O$; $Al_2O_3$; and $B_2O_3$, wherein $B_2O_3$(mol %)−($R_2O$(mol %)−$Al_2O_3$(mol %)) 4.5 mol %. In still other embodiments, the glass is ion exchanged and has a Vickers crack initiation threshold, determined by application of an indenter load to the surface, of at least about 30 kgf. In some embodiments, the glass comprises at least about 50 mol % $SiO_2$; at least about 10 mol % $R_2O$, wherein $R_2O$ comprises $Na_2O$; $Al_2O_3$, wherein −0.5 mol %≤$Al_2O_3$(mol %)−$R_2O$(mol %)≤2 mol %; and $B_2O_3$, wherein $B_2O_3$(mol %)−($R_2O$(mol %)−$Al_2O_3$(mol %))≥4.5 mol %. Such glasses are described in U.S. Provisional patent application Ser. No. 13/903,398, by Matthew J. Dejneka et al., entitled "Ion Exchangeable Glass with High Damage Resistance," filed May 28, 2012, and claiming priority to U.S. Provisional Patent Application No. 61/653,485, filed May 31, 2012, the contents of which are incorporated herein by reference in their entirety.

In still other embodiments, the alkali aluminosilicate glass comprises at least about 4 mol % $P_2O_5$, wherein ($M_2O_3$(mol %)/$R_xO$(mol %))<1, wherein $M_2O_3$=$Al_2O_3$+$B_2O_3$, and wherein $R_xO$ is the sum of monovalent and divalent cation oxides present in the alkali aluminosilicate glass. In some embodiments, the monovalent and divalent cation oxides are selected from the group consisting of $Li_2O$, $Na_2O$, $K_2O$, $Rb_2O$, $Cs_2O$, MgO, CaO, SrO, BaO, and ZnO. In some embodiments, the glass comprises 0 mol % $B_2O_3$. The glass is described in U.S. patent application Ser. No. 13/678,013 by Timothy M. Gross, entitled "Ion Exchangeable Glass with High Crack Initiation Threshold," filed Nov. 15, 2012, and claiming priority to U.S. Provisional Patent Application No. 61/560,434, filed Nov. 16, 2011, the contents of which are incorporated herein by reference in their entirety.

In some embodiments, the alkali aluminosilicate glasses described hereinabove are substantially free of (i.e., contain 0 mol % of) at least one of lithium, boron, barium, strontium, bismuth, antimony, and arsenic.

In some embodiments, the alkali aluminosilicate glasses described hereinabove are down-drawable by processes known in the art, such as slot-drawing, fusion drawing, re-drawing, and the like, and has a liquidus viscosity of at least 130 kilopoise.

The following examples illustrate the features and advantages of the method described herein, and are in no way intended to limit the disclosure or appended claims thereto.

The chemical strengthening method described herein is illustrated by the ion exchange of glass samples having two distinct compositions. Samples comprising glass A have a nominal composition of 68.96 mol % $SiO_2$, 0 mol % $B_2O_3$, 10.28 mol % $Al_2O_3$, 15.21 mol % $Na_2O$, 0.012 mol % $K_2O$, 5.37 mol % MgO, 0.007 mol % $Fe_2O_3$, 0.006 mol % $ZrO_2$, and 0.17 mol % $SnO_2$. Glass A is described in U.S. patent application Ser. No. 13/533,298, filed Jun. 26, 2012, referenced hereinabove. Samples comprising glass B have a nominal composition of 67.55 mol % $SiO_2$, 3.67 mol % $B_2O_3$, 12.67 mol % $Al_2O_3$, 13.66 mol % $Na_2O$, 0.014 mol % $K_2O$, 2.33 mol % MgO, 0.008 mol % $Fe_2O_3$, 0.005 mol % $ZrO_2$, and 0.10 mol % $SnO_2$. Glass B is described in U.S. patent application Ser. No. 13/903,433, filed May 28, 2013, and claiming priority to U.S. Provisional Patent Application No. 61/653,489, referenced hereinabove. Neither glass contains $Li_2O$ and/or CaO.

The conditions under which ion exchange were conducted are listed in Tables 1 and 2 for glasses A and B, respectively. Salt bath composition, temperature, and ion exchange time were varied for both types of glasses.

TABLE 1

Conditions used to ion exchange glass A.

| | Bath | | | |
|---|---|---|---|---|
| | 1 | 2 | 3 | 4 |
| Ion exchange bath composition | 100% $KNO_3$ | 100% $KNO_3$ | 98.5% $KNO_3$ + 1.5% $KSO_4$ | 97% $KNO_3$ + 3% $KSO_4$ |
| Ion exchange temperature (° C.) | 410 | 440 | 470 | 500 |
| Ion exchange time (hours) | 6, 9, 13 | 4, 6, 9 | 2, 3, 5 | 1, 2, 3 |

| | Bath | | | |
|---|---|---|---|---|
| | 5 | 6 | 7 | 8 |
| Ion exchange bath composition | 95.5% $KNO_3$ + 4.5% $KSO_4$ | 94% $KNO_3$ + 6% $KSO_4$ | 92.5% $KNO_3$ + 7.5% $KSO_4$ | 91% $KNO_3$ + 9% $KSO_4$ |
| Ion exchange temperature (° C.) | 530 | 560 | 590 | 620 |
| Ion exchange time (hours) | 0.5, 1, 2 | 0.33, 0.67, 1.33 | 0.25, 0.5, 1 | 0.17, 0.33 |

TABLE 2

Conditions used to ion exchange glass B.

| | Bath | | |
|---|---|---|---|
| | 1 | 2 | 3 |
| Ion exchange bath composition | 100% $KNO_3$ | 95% $KNO_3$ + 5% $KSO_4$ | 92% $KNO_3$ + 8% $KSO_4$ |
| Ion exchange temperature (° C.) | 420 | 530 | 580 |
| Ion exchange time (hours) | 5.5 | 1.75 | 1, 1.5, 2 |

Compressive stress profiles of the ion exchanged samples were determined using a method for measuring the stress profile based on the TM and TE guided mode spectra of the optical waveguide formed in the ion-exchanged glass. The method includes digitally defining positions of intensity extrema from the TM and TE guided mode spectra, and calculating respective TM and TE effective refractive indices from these positions. TM and TE refractive index profiles $n_{TM}(z)$ and $n_{TE}(z)$ are calculated using an inverse WKB calculation. The method also includes calculating the stress profile $S(z)=[n_{TM}(z)-n_{TE}(z)]/SOC$, where SOC is a stress optic coefficient for the glass substrate. This method is described in U.S. patent application Ser. No. 13/463,322 by Douglas C. Allan et al., entitled "Systems and Methods for Measuring the Stress Profile of Ion-Exchanged Glass," filed May 3, 2012, and claiming priority to U.S. Provisional Patent Application No. 61/489,800, filed May 25, 2011, the contents of which are incorporated herein by reference in their entirety.

The compressive stress profiles were determined using the inverse WKB method for samples of glass A that were ion exchanged under different conditions method, and the results are plotted in FIGS. 3a and 3b. When ion exchanged at 410° C. for 9 hours (bath 1 in Table 1), a linear stress profile (FIG. 3b) was obtained. Ion exchange at 560° C. for 80 minutes (bath 6 in table 1) produces a stress profile (FIG. 3a) in which the compressive stress at the surface of the glass is lower and larger amounts of compressive stress are retained at deeper depths below the surface.

Figure 5:
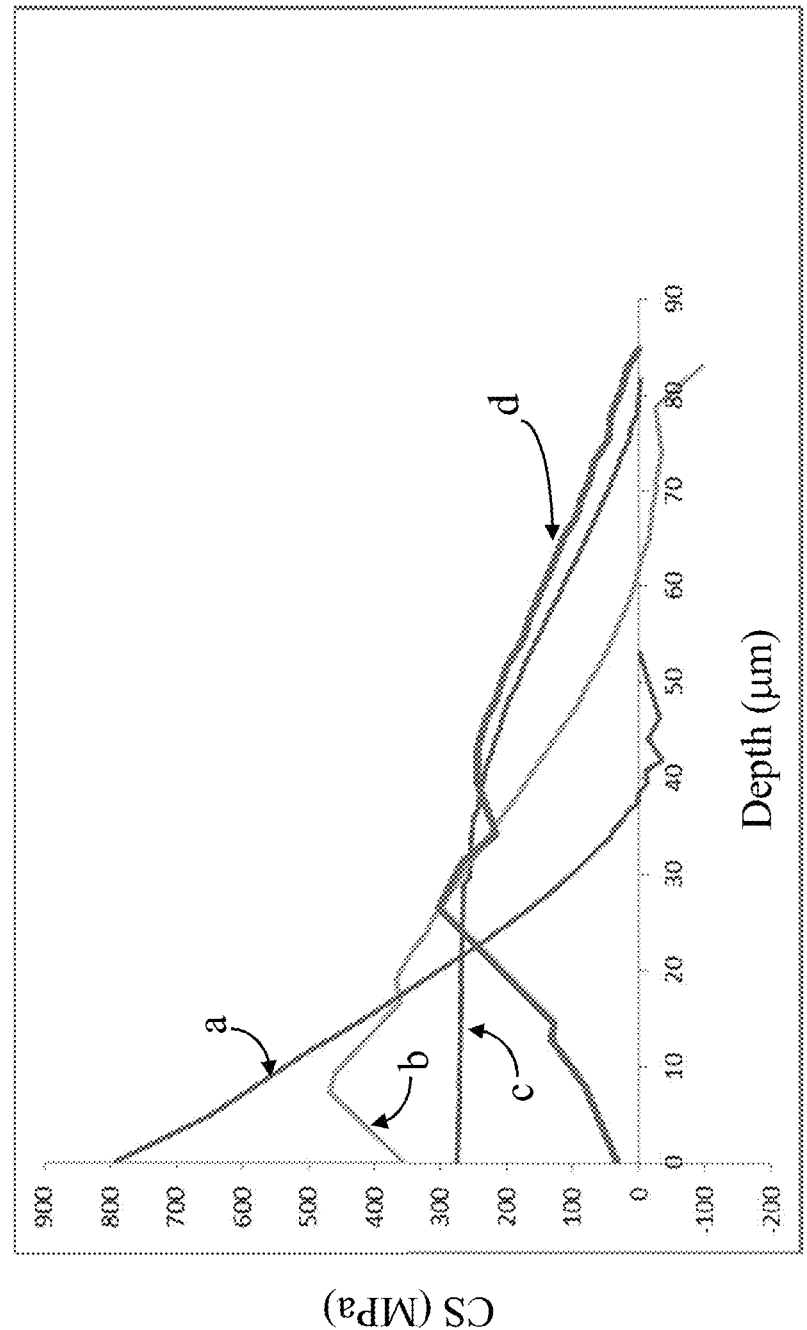
FIG. 5 is a plot of compressive stress profiles determined using the inverse WKB method for samples of a second alkali aluminosilicate glass (glass B) that were ion exchanged under different conditions.

Compressive stress profiles were determined using the inverse WKB method for samples of glass B that were ion exchanged under different conditions method, and the results are plotted in FIG. 5. When ion exchanged at 420° C. for 5.5 hours (bath 1 in Table 2), an error function-like stress profile (line "a" in FIG. 5) was obtained. Ion exchange at 530° C. for 1.75 hours (bath 2 in Table 2) produced a stress profile (line "b" in FIG. 5) in which a maximum compressive stress of about 470 MPa was achieved at a depth of about 10 μm below the surface. After ion exchange for 1.5 hours at 580° C. (bath 3 in Table 2), the compressive stress profile is essentially constant at about 280 MPa from the surface of the glass to a depth of about 35 μm, after which the stress profile gradually decreases to 0 MPa at about 80 μm (line "c" in FIG. 5). Ion exchange for 1.5 hours at 560° C. (bath 3 in Table 2) produced a compressive stress profile in which a maximum CS of about 300 MPa occurs at a depth of about 30 μm and a depth of layer of about 85 μm (line "d" in FIG. 5).

Figure 6:
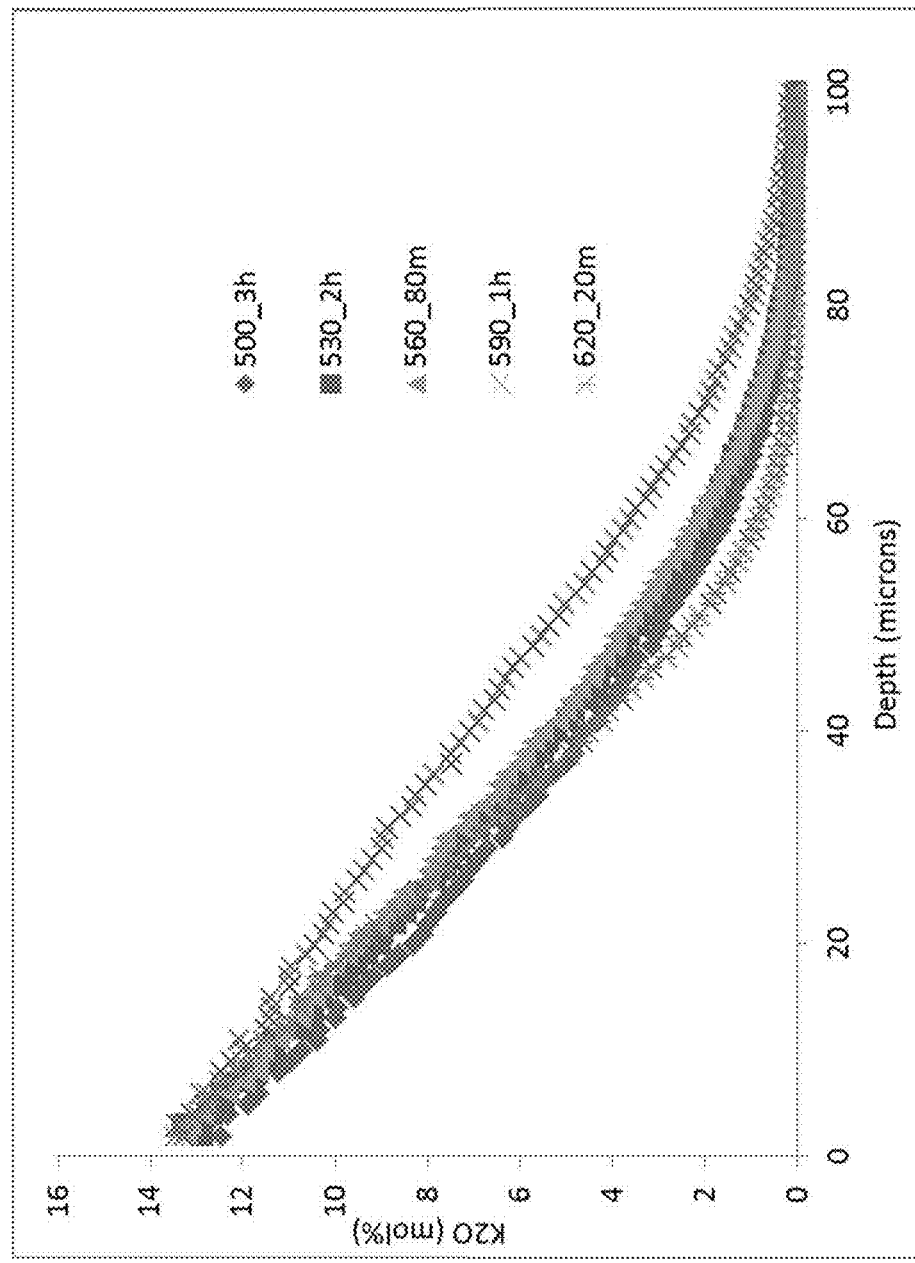
FIG. 6 is a plot of $K_2O$ profiles for glass samples that were ion exchanged under different conditions.

FIG. 6 is a plot of $K_2O$ profiles for samples of glass 1 that were ion exchanged under different conditions. The $K_2O$ profiles were determined by electron microprobe analysis. The $K^+$ ions penetrate into glass to approximately the same depth as the compressive stress profiles shown in FIGS. 3a and 3b.

Figure 7:
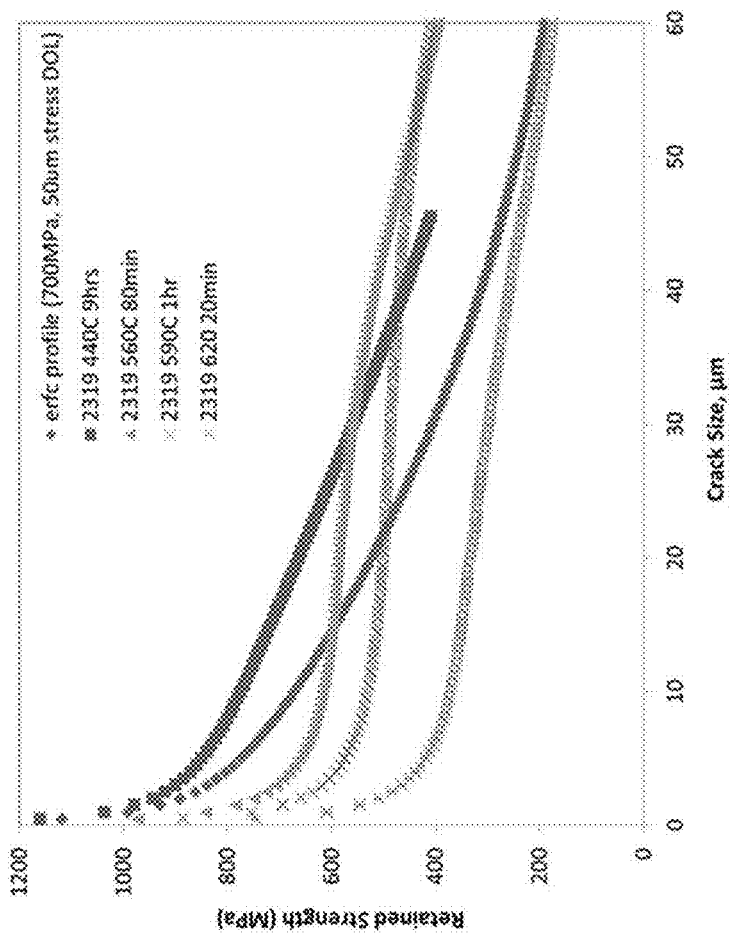
FIG. 7 is a plot of calculated retained strength of ion exchanged samples of glass.

The retained strength performance versus pre-existing flaw (crack) sizes from modeling is shown in FIG. 6, which is a plot of calculated retained strength of ion exchanged samples of glass A. The results of retained strength measurements of samples of glass B that were ion exchanged at 420° C. for 5.5 hours, 530° C. for 1.75 hours, and 580° C. for 1 hour were determined after 2 psi, 5 psi, 7 psi, 10 psi, and 15 psi abrasion are shown in FIG. 7. The abrasion particles were 90 grit SiC, total volume was 1 ml, and abrasion duration was 5 seconds. After 2 psi abrasion, which corresponds to a shallower flaw depth, glass that was ion exchanged at 420° C. had much higher retained strength than the glasses ion exchanged at higher temperatures. When the abrasion pressure is increased to 5 psi, however, the characteristic retained strength of glass ion exchanged at 420° C. decreased from 540 MPa to 425 MPa. The retained strength after 2 psi abrasion for the glass ion exchanged at 530° C. is 434 MPa. The value reduced to 410 MPa, where the reduction is only 24 MPa. As the flaw introduction depth is increased by increasing abrasion pressure from 7 psi to 15 psi, glasses that were ion exchange at 530° C. and 580° C. show higher retained strength capabilities compared to those of standard 420° C. ion exchanged glass. Such retained strength performance may also provide advantage in device (i.e., display windows and screens for electronic devices) level performance, such as drop testing.

Figure 8:
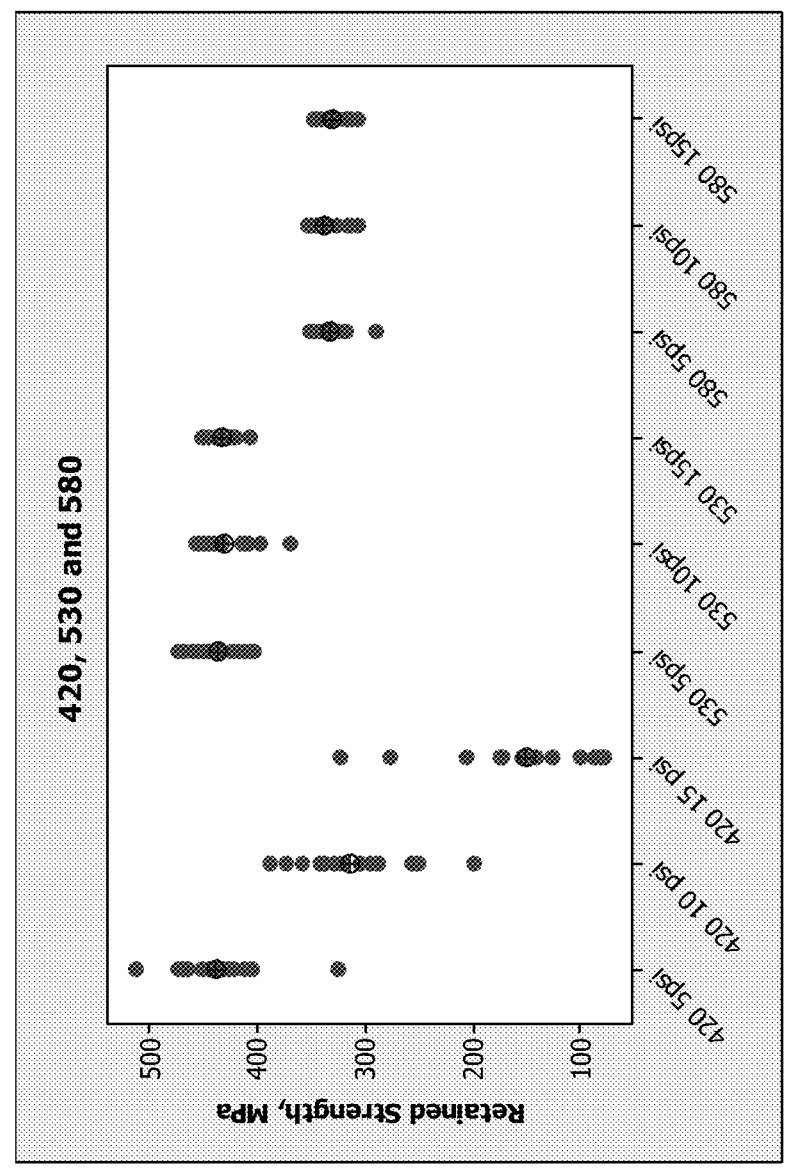
FIG. 8 is a plot of results of retained strength measurements of ring-on-ring testing after different abrasion pressures on ion exchanged samples of a first alkali aluminosilicate glass (glass A)
Figure 9:
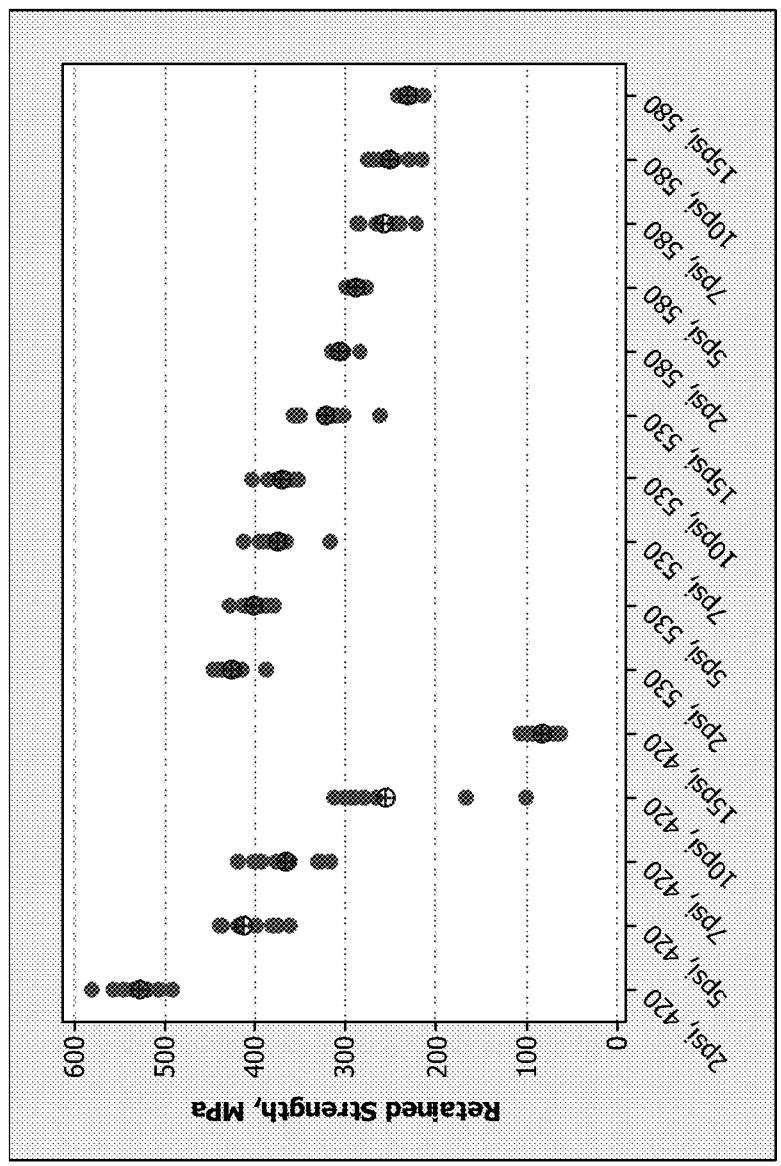
FIG. 9 is a plot of results of retained strength performance of ring-on-ring testing after different abrasion pressures on ion exchanged samples of a second alkali aluminosilicate glass (glass B).

The advantages provided by the engineered stress profiles described herein are demonstrated by retained strength performance of ring-on-ring testing on ion exchanged samples of glass A and glass B. Abrasion particles were 90 grit SiC, total volume was 1 ml, and abrasion duration was 5 seconds. The retained strength performance of ring-on-ring testing after abrasion at different pressures (5 psi, 10 psi, and 15 psi) on glass A samples that were ion exchanged under different conditions is shown in FIG. 8. The samples were ion exchanged at either 420° C. for 5.5 hours, 530° C. for 2.5 hours, or 580° C. for 1.33 hours. The engineered stress profiles obtained after ion exchange at 530° C. and 580° C. provide greater retained strength than the stress profile obtained with ion exchange at 420° C. The retained strength performance of ring-on-ring testing after abrasion at different pressures (2 psi, 5 psi, 7 psi, 10 psi, and 15 psi) on glass B samples that were ion exchanged under different conditions is shown in FIG. 9. The samples were ion exchanged at either 420° C. for 5.5 hours, 530° C. for 1.75 hours, or 580° C. for 1 hour. The engineered stress profile obtained by ion exchange at 530° C. provides greater retained strength than the stress profile obtained by ion exchange at 420° C. This retained strength performance may also provide device level performance, when subjected to different types of testing such as, for example, as drop testing.

While typical embodiments have been set forth for the purpose of illustration, the foregoing description should not be deemed to be a limitation on the scope of the disclosure or appended claims. Accordingly, various modifications, adaptations, and alternatives may occur to one skilled in the art without departing from the spirit and scope of the present disclosure or appended claims.

The invention claimed is:

1. A method of strengthening an alkali aluminosilicate glass comprising first metal cations and having an anneal point, the method comprising:
   a. immersing the alkali aluminosilicate glass in a molten salt bath, the molten salt bath comprising at least one salt of a second metal, wherein cations of the second metal are larger than the first metal cations;
   b. ion exchanging the cations of the second metal from the molten salt bath for the first metal cations in the alkali aluminosilicate glass at a temperature of greater than about 420° C. and at least about 30° C. less than the anneal point, wherein ion exchanging forms a region of compressive stress, the region extending from a surface of the glass to a depth of layer of at least 40 μm into the glass, and
   wherein
   a compressive stress at the surface is at least about 100 MPa and less than a compressive stress at a first depth,
   at least a portion of a compressive stress between the surface and the first depth is less than the compressive stress at the surface,
   the first depth being between 30% and 70% of the depth of layer, and
   the compressive stress at the first depth is a buried peak.

2. The method of claim 1, wherein the first metal cations are sodium cations and the second cations are at least one of potassium cations, rubidium cations, or silver cations.

3. The method of claim 2, wherein the molten salt bath comprises at least one of potassium sulfate and potassium nitrate.

4. The method of claim 3, wherein the molten salt bath further comprises up to about 10 wt % of at least one sodium salt.

5. The method of claim 1, wherein the first depth is about 25 μm.

6. The method of claim 5, wherein the compressive stress at a first depth is at least about 350 MPa.

7. The method of claim 5, wherein the alkali aluminosilicate glass has a retained strength of at least about 200 MPa.

8. The method of claim 5, wherein ion exchanging the alkali aluminosilicate glass comprises ion exchanging the alkali aluminosilicate glass for a period ranging from about 0.5 hours to about 8 hours.

9. The method of claim 1, wherein the glass has a thickness of up to about 1.5 mm.

10. The method of claim 1, further comprising:
   a. immersing the alkali aluminosilicate glass in a second molten salt bath, the second molten salt bath comprising at least one salt of a third metal, wherein cations of the third metal are larger than the first metal cations and the cations of the second metal; and
   b. ion exchanging the cations of the third metal from the second molten salt bath for at least one of the first metal cations and the cations of the second metal in the alkali aluminosilicate glass at a temperature of greater than about 420° C. and at least about 30° C. less than the anneal point, wherein ion exchanging in the second molten salt bath forms a surface region comprising the cations of the third metal.

11. The method of claim 1, further comprising:
   a. immersing the alkali aluminosilicate glass in a second molten salt bath, the second molten salt bath comprising at least one salt of the second metal; and
   b. ion exchanging the cations of the second metal from the second molten salt bath for the first metal cations in the alkali aluminosilicate glass at a temperature of less than or equal to about 420° C., wherein the surface compressive stress is formed by ion exchanging in the second molten salt bath creates a maximum compressive stress at the surface.

12. The method of claim 1, wherein the compressive stress between the surface and the first depth is a buried inverted peak.

13. An alkali aluminosilicate glass article, the alkali aluminosilicate glass article having a region under a compressive stress, the region extending from a surface of the alkali aluminosilicate glass article to a depth of layer of at least about 40 μm within the alkali aluminosilicate glass article,
   wherein
      the alkali aluminosilicate glass article has a compressive stress at the surface, a compressive stress at a first depth, and a compressive stress between the surface and the first depth,
      the first depth being between 30% and 70% of the depth of layer,
      the compressive stress at the surface is at least about 100 MPa and less than the compressive stress at the first depth, and
      the compressive stress at the first depth is a buried peak, and
      at least a portion of the compressive stress between the surface and the first depth is less than the compressive stress at the surface.

14. The alkali aluminosilicate glass article of claim 13, wherein the first depth is about 25 μm.

15. The alkali aluminosilicate glass article of claim 14, wherein the compressive stress at a first depth is at least about 350 MPa.

16. The alkali aluminosilicate glass article of claim 14, wherein the alkali aluminosilicate glass article has a retained strength of at least about 200 MPa.

17. The alkali aluminosilicate glass article of claim 13, wherein the alkali aluminosilicate glass article comprises at least about 50 mol % $SiO_2$ and at least about 11 mol % $Na_2O$, and wherein the compressive stress at the surface is at least about 900 MPa.

18. The alkali aluminosilicate glass article of claim 17, wherein the alkali aluminosilicate glass article further comprises $Al_2O_3$ and at least one of $B_2O_3$, $K_2O$, MgO and ZnO, and wherein $-340+27.1 \cdot Al_2O_3 - 28.7 \cdot B_2O_3 + 15.6 \cdot Na_2O - 61.4 \cdot K_2O + 8.1 \cdot (MgO+ZnO) \geq 0$ mol %.

19. The alkali aluminosilicate glass article of claim 13, wherein the compressive stress between the surface and the first depth is a buried inverted peak.

* * * * *